May 15, 1934.  E. T. McCARTHY  1,959,105
EXCESS PRESSURE REGULATOR
Filed Nov. 15, 1930    2 Sheets-Sheet 1

Inventor
Elmer T. McCarthy

May 15, 1934.  E. T. McCARTHY  1,959,105
EXCESS PRESSURE REGULATOR
Filed Nov. 15, 1930   2 Sheets-Sheet 2

Inventor
Elmer T. McCarthy

Patented May 15, 1934

1,959,105

UNITED STATES PATENT OFFICE 1,959,105

EXCESS PRESSURE REGULATOR

Elmer T. McCarthy, Evanston, Ill.

Application November 15, 1930, Serial No. 495,850

10 Claims. (Cl. 137—153)

My invention relates to excess pressure regulators and particularly to that type of regulator by means of which a differential is maintained for example between the feed header pressure and the boiler pressure of a system.

It is the principal purpose of my invention to provide a device of this character in which the pressure difference between two points in the system may be maintained by utilizing a balanced valve construction for controlling the frictional resistance to flow of fluid at a particular point in the system.

More specifically my invention contemplates the provision of a valve for regulating the pressure difference between two points in the system which valve is controlled by a diaphragm balanced between the lower pressure on the one side and a second pressure on the other side obtained by by-passing a portion of the fluid from the high pressure apparatus through restricted orifices to a point of lower pressure.

I will describe one form which my invention may take by reference to the accompanying drawings wherein—

Figure 1:
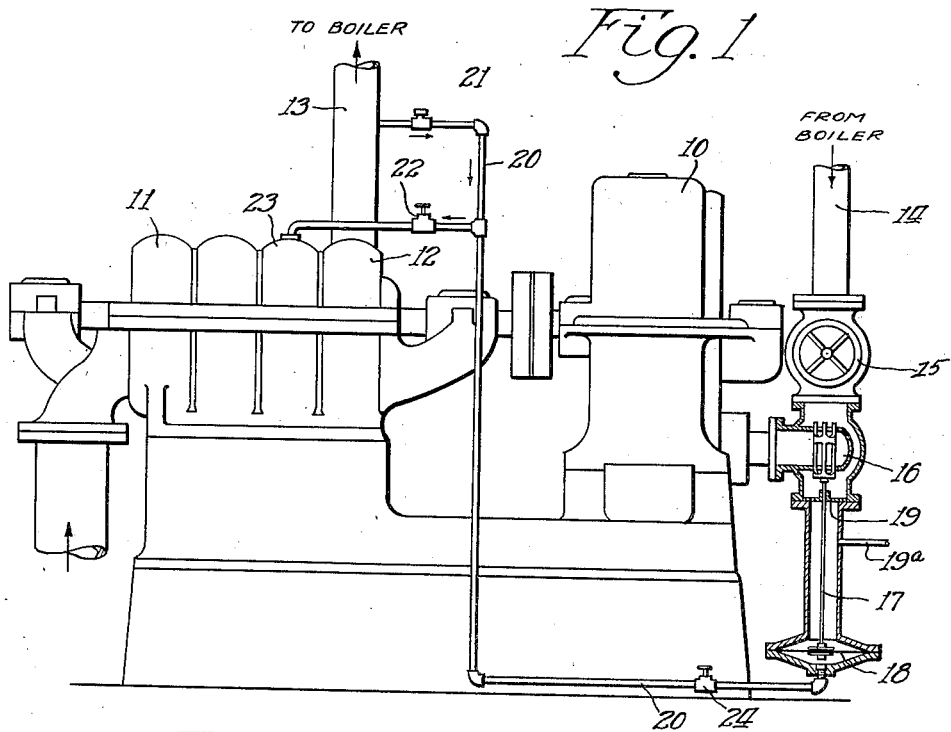
Fig. 1 illustrates a turbine driven boiler feed pump system embodying my invention.

Referring now in detail to the drawings, I will first describe my invention as applied to the construction shown in Fig. 1. In this case, a turbine drives a multi-stage pump 11 which pump is of the usual centrifugal type having in the present instance four stages, the last stage 12 delivering water through the pipe 13 to the boiler. Steam for driving the turbine may be received from the boiler through pipe 14, manually operated valve 15, and the control balanced valve 16.

It is desirable, of course, to maintain a certain differential in pressure between the boiler pressure represented for example by the pressure in pipe 14 and the feed pressure of the pump 11 represented for example by the pressure in pipe 13. In order to maintain this differential, it is necessary to increase the output pressure of the pump if the steam pressure in the boiler increases. Also, the reverse is true, that is, if the boiler pressure drops, the pump pressure must also be dropped. I accomplish this result by the regulation of the valve 16 to control the speed of the turbine 10 and thus the output pressure of pump 11 in response to variations in the excess of pressure of the pump over the boiler.

Figure 3:
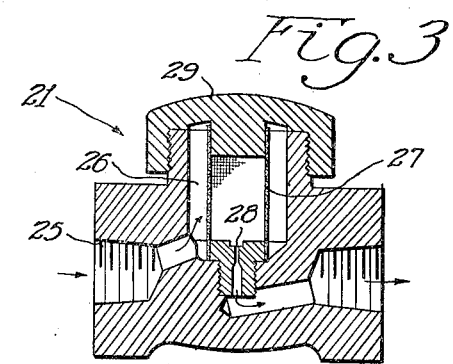

This is accomplished in the following manner: Valve 16 is connected by operating stem 17 to a diaphragm 18. The baffle 19 is either open around the stem 17 or the baffle may be close fitting and a pipe connection 19A made direct to the boiler drum to avoid variations in steam pressure due to superheater and pipe friction. With either arrangement the diaphragm 18 on its upper surface is subjected to the pressure of the steam from the boiler. The diaphragm 18 is balanced by pressure from the other side through a conduit 20 which pressure is obtained by by-passing a certain amount of the water from pipe 13 through a restricted orifice unit 21 and a second restricted orifice unit 22 to some lower pressure outlet which in the example shown is the third stage 23 of the pump 11. A valve 24 is inserted in pipe 20 for dampening pressure pulsations transmitted to the lower side of the diaphragm 18. The unit 21 is shown in section in Fig. 3 and consists of a restricted orifice unit combined with a strainer.

Figure 2:
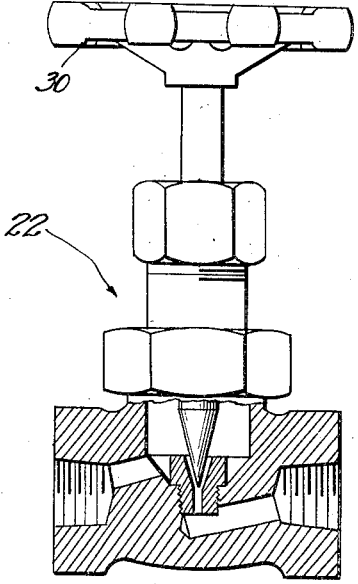
Figs. 2 and 3 are detailed sections of a valve and screen protected orifice employed in the system.

The water enters at 25, passes upwardly into the chamber 26 and then through the reticulated member 27 which may be in the form of a perforated metal sleeve to the orifice 28 and then into conduit 20. A suitable cap 29 carries the strainer 27 which fits down over the member in which the orifice 28 is located thus making it an easy matter to remove the strainer for cleaning purposes whenever it is desired. The fluid passing through the orifice 28 then passes through the member 22 to a lower pressure level, and it is obvious that by regulating the relative sizes of the restrictions at 21 and 22, the pressure in the conduit 20 can be made whatever value between the pressure in pipe 13 and the pressure in stage 23 of the pump that is desired. This is accomplished by making the element 22 a needle valve as shown in Fig. 2, and such devices being common it is believed to be unnecessary to go into a detailed description thereof. It is believed to be sufficient to say that by turning the handle 30 the valve can be opened or closed to decrease or increase respectively the pressure in conduit 20.

Assume the steam throttle 15 and needle valve 22 closed and needle valve 24 open. On opening the throttle 15 steam pressure will be applied to the upper surface of diaphragm 18 through the clearance space around stem 17 where it passes through baffle 19, or boiler pressure may be applied through conduit 19A. The steam pressure will hold the diaphragm down and the valve 16 open while the pump accelerates. When the pressure of water in pipe 13 transmitted through conduit 20 to the lower surface of the diaphragm 18 exceeds slightly the steam pressure above it, the diaphragm will move upward throttling the steam supplied through valve 16 until the water pressure in pipe 13 balances the steam pressure. The pump will continue to operate delivering water at a pressure substantially equal to the steam pressure. The excess or differential will be zero.

If now the needle valve 22 is opened slightly, the pressure in conduit 20 will be somewhat decreased. This will cause the diaphragm 18 to move downwardly opening valve 16, thereby increasing the turbine and pump speed and consequently the pressure in pipe 13.

The pressure in pipe 13 continues to rise until the pressure in conduit 20 increases enough to equal again the steam pressure and balance the diaphragm. The opening movement of the valve 16 then stops and the pump continues to operate at the higher speed with the discharge pressure a definite amount above the steam pressure of the system. Opening needle valve 22 still more results in a further increase in the pump discharge pressure and excess over steam pressure. Closing needle valve 22 causes a corresponding reduction in pump pressure. Needle valve 24 is kept partially closed to dampen pulsations and prevent hunting and surging which are likely to occur in systems of this kind.

Having arrived at a setting of valve 22 to give the desired differential, the system could then be left alone, and it is obvious that, if the pressure in 13 built up to a higher value, the diaphragm 18 would be moved upwardly due to increase in pressure in the conduit 20 and thus partially close valve 16 and reduce the speed of the turbine to again establish the balance. Similarly, if the boiler pressure were increased, the diaphragm 18 would be moved downwardly to thus increase the flow of steam to the turbine and speed it up causing a greater output pressure for the pump.

Figure 4:
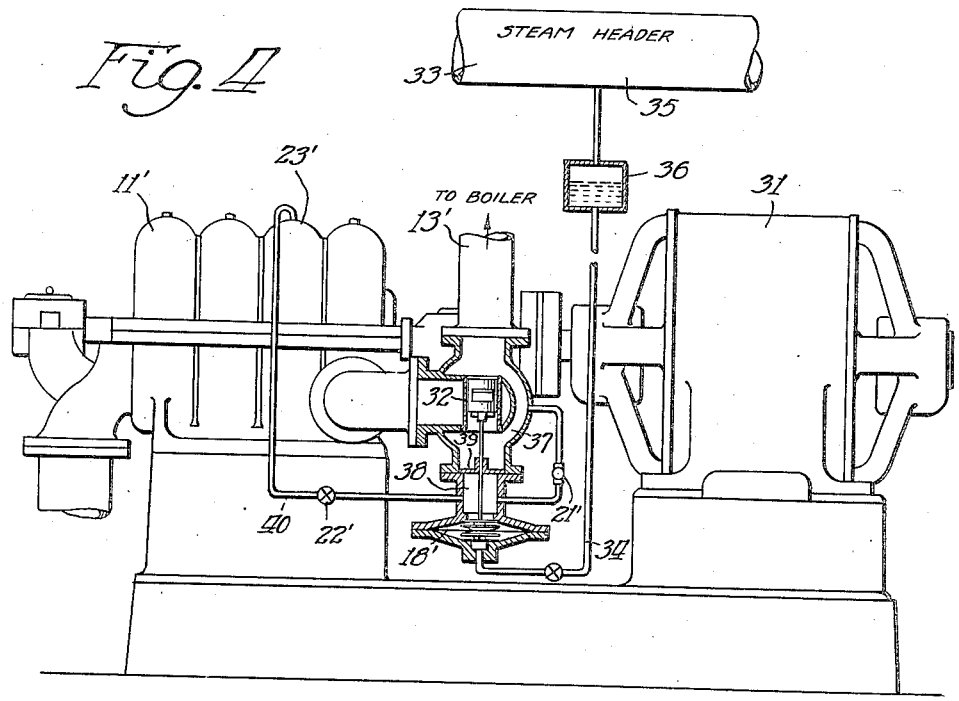
Fig. 4 is a view of the motor driven feed pump system for supplying water for instance to a steam boiler which system embodies my invention.

Referring now to Fig. 4, in this type of construction the motor 31 drives the pump 11' which pump delivers water through the valve 32 to a boiler which feeds steam into the steam header 33 at a pressure substantially that of boiler pressure if the loss due to friction be disregarded.

Now in order to control this device and maintain a certain differential in pressure between the feed header and the pressure in the steam header, I preferably connect one side of diaphragm 18' by means of conduit 34 to the header 35, there being interposed a water supply chamber at 36 in order to prevent live steam reaching the diaphragm. On the other side of the diaphragm 18' the pressure is intermediate between the pressure in feed header 13' and some pressure lower than the steam pressure such as that of the stage 23' of the pump. To obtain this pressure, chamber 37 is connected to chamber 38 through orifice containing member 21', and chamber 38 is connected to stage 23' of the pump through needle valve 22' and conduit 40.

Thus it will be seen that by adjusting 22', the outlet valve 32 of the pump can be made to open or close as the pressure of the steam header 33 rises or falls to maintain the required excess pressure in pipe 13', over the pressure in the boiler.

Figure 5:
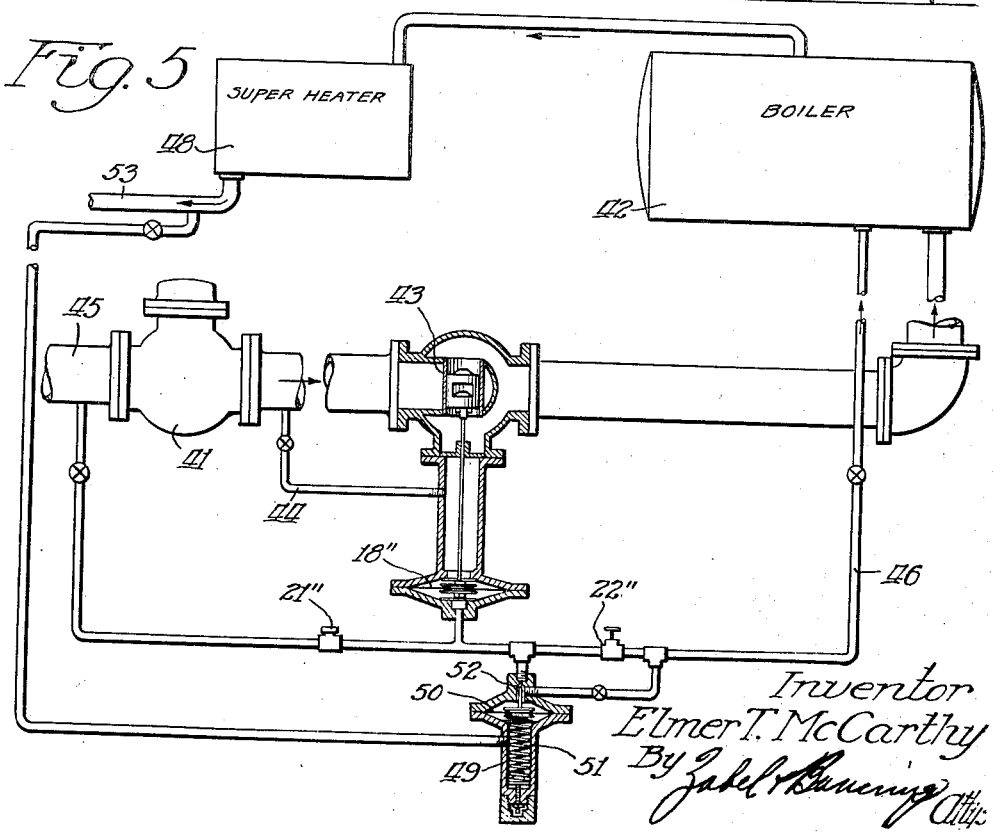
Fig. 5 illustrates my invention applied to the control of the pressure drop of fluid through a boiler water level regulator for example.

In Fig. 5, I have shown my invention applied to maintaining a constant pressure drop across a water level regulating valve 41 which controls the water input to a boiler 42. In this form of the invention, the valve 43 is placed between valve 41 and the boiler inlet, and the position of this valve is maintained by means of a diaphragm 18'' which is balanced between a pressure obtained through conduit 44 from the outlet of valve 41 and a pressure obtained from the input line 45 of valve 41 through orifice member 21'' and needle valve 22'', the by-pass leading into the boiler 42 through conduit 46.

Assuming for example that the boiler pressure drops suddenly, the result would of course be to reduce the pressure in the conduit leading from valve 41 to the boiler. This, however, also reduces the pressure in conduit 44 and thus the pressure on top of the diaphragm 18'' causing the diaphragm to move upwardly and partially close valve 43 so as to reestablish the pressure drop across valve 41.

I find that this system may also be controlled automatically to produce greater pressure drops across the feed valve 41 and take care of greater demands for water on the part of the boiler due to greater amounts of steam being withdrawn. For this purpose, I take a connection off the steam lead 53 on the outlet side of the superheater 48 if one is used or from some other point in the steam lead from the boiler to the main steam header to a control unit 49 which has therein a diaphragm 50 similar in all respects to the diaphragm 18. This pressure is lower than the boiler inlet pressure due to the pipe friction losses and the load demands so a spring 51 or some equivalent means is used as an aid in balancing the diaphragm against the boiler pressure transmitted through conduit 46. Diaphragm 50 controls a needle valve 52 which now takes the place of needle valve 22'' which is closed.

Thus the position of diaphragm 18'' is now dependent not upon a fixed drop in pressure across valve 41 but upon a variable pressure depending upon the difference in pressure between the outlet of the superheater and the boiler which difference is a function of the steam demand or amount of flow. That is to say, should the steam demand become greater thus using more water from the boiler, the pressure at the outlet of the superheater would drop thus allowing diaphragm 50 to drop opening the orifice controlled by needle valve 52 and reducing the pressure on the underside of diaphragm 18''. Valve 43 would be opened by this reduction in pressure to cause a greater drop in pressure across valve 41 and thus immediately increase the flow of water to the boiler to take care of the additional load.

From the above description, it is thought that the construction and advantages of this system will be clear to those skilled in this art, and, having thus described my invention, what I claim as new and desire to secure by Letters Patent is:

1. A method of obtaining a variable differential between fluid pressures at two points in a system which comprises balancing the lower of these pressures against the intermediate pressure of fluid flowing between two restrictions in a conduit receiving fluid from said higher pressure and discharging to some lower pressure below the aforesaid lower pressure, and varying the size of one of said restrictions and controlling the higher pressure from this balance.

2. A regulating valve system for controlling the difference between the fluid pressures at two points in the fluid passages comprising a valve controlling the pressure at one of said points, a diaphragm operatively connected thereto, means for applying the lower pressure to one side of said diaphragm, and means for supplying a balancing pressure to the other side of said diaphragm comprising a conduit receiving fluid from the point of higher pressure and discharging it at a pressure below said lower pressure, a connection from said conduit to the other side of said diaphragm, means including a variable restriction in said conduit for changing the pressure in said conduit at said connection, and control means for said variable restriction responsive to the pressure difference between two other points in a system in which fluid is flowing.

3. A method of obtaining a variable differential between fluid pressures at two points in a system responsive to a variable differential in pressure between two other points in the same or another system through which fluid is flowing which comprises balancing the lower of these pressures against the intermediate pressure of fluid flowing between two restrictions in a conduit receiving fluid from said higher pressure and discharging to some lower pressure, and varying the size of one of said restrictions by means of the variations in said differential in pressure between said two other points.

4. A regulating system for maintaining a differential between the fluid pressures at two points comprising means including a valve controlling the higher pressures, a diaphragm controlling said valve, means for constantly applying the lower pressure to one side of the diaphragm, a conduit receiving fluid from the point of higher pressure and discharging it at a pressure below the lower pressure, said conduit having spaced restrictions therein providing a conduit section between said restrictions having a pressure substantially equal to the lower pressure, and means connecting said secton to the other sde of said diaphragm.

5. In a fluid transmission system, means for establishing and maintaining a constant difference in pressure between two points in the system comprising a valve, means responsive to movements of said valve for varying the higher pressure, and means controlling the valve comprising a diaphragm, means continuously applying the lower pressure to one side of the diaphragm, and means continuously applying a second pressure on the other side of the diaphragm to balance said lower pressure comprising a by-pass from the high pressure point to a point of pressure below said lower pressure.

6. In a fluid transmission system, means for establishing and maintaining a constant difference in pressure between two points in the system comprising a valve, means responsive to movements of said valve for varying the higher pressure, and means controlling the valve comprising a diaphragm, means continuously applying the lower pressure to one side of the diaphragm, and means continuously applying a second pressure on the other side of the diaphragm to balance said lower pressure comprising a by-pass from the high pressure point to a point of pressure below said lower pressure, said by-pass having a pair of normally fixed restrictions therein.

7. In a fluid transmission system, means for establishing and maintaining a constant difference in pressure between two points in the system comprising a valve, means responsive to movements of said valve for varying the higher pressure, and means controlling the valve comprising a diaphragm, means continuously applying the lower pressure to one side of the diaphragm, and means continuously applying a second pressure on the other side of the diaphragm to balance said lower pressure comprising a by-pass from the high pressure point to a point of pressure below said lower pressure, said by-pass having a pair of normally fixed restrictions therein, one of said restrictions being adjustable to change the pressure difference.

8. In a fluid transmission system, means for establishing and maintaining a constant difference in pressure between two points in the system comprising a valve, means responsive to movements of said valve for varying the higher pressure, and means controlling the valve comprising a diaphragm, means continuously applying the lower pressure to one side of the diaphragm, and means continuously applying a second pressure on the other side of the diaphragm to balance said lower pressure comprising a by-pass from the high pressure point to a point of pressure below said lower pressure, said valve being located at said high pressure point.

9. In a fluid transmission system, means for establishing and maintaining a constant difference in pressure between two points in the system comprising a valve, means responsive to movements of said valve for varying the higher pressure, and means controlling the valve comprising a diaphragm, means continuously applying the lower pressure to one side of the diaphragm, and means continuously applying a second pressure on the other side of the diaphragm to balance said lower pressure comprising a by-pass from the high pressure point to a point of pressure below said lower pressure, said valve being located at the low pressure point.

10. A method of obtaining a variable differential between fluid pressures at two points in a system responsive to a variable differential in pressure between two other points in the same or another system through which fluid is flowing which comprises balancing the lower of these pressures against the intermediate pressure of fluid flowing between two restrictions in a conduit receiving fluid from said higher pressure and discharging to some lower pressure, and varying the rate of flow through one of said restrictions by means of the variations in said differential in pressure between said two other points.

ELMER T. McCARTHY.